Patented Dec. 11, 1923.

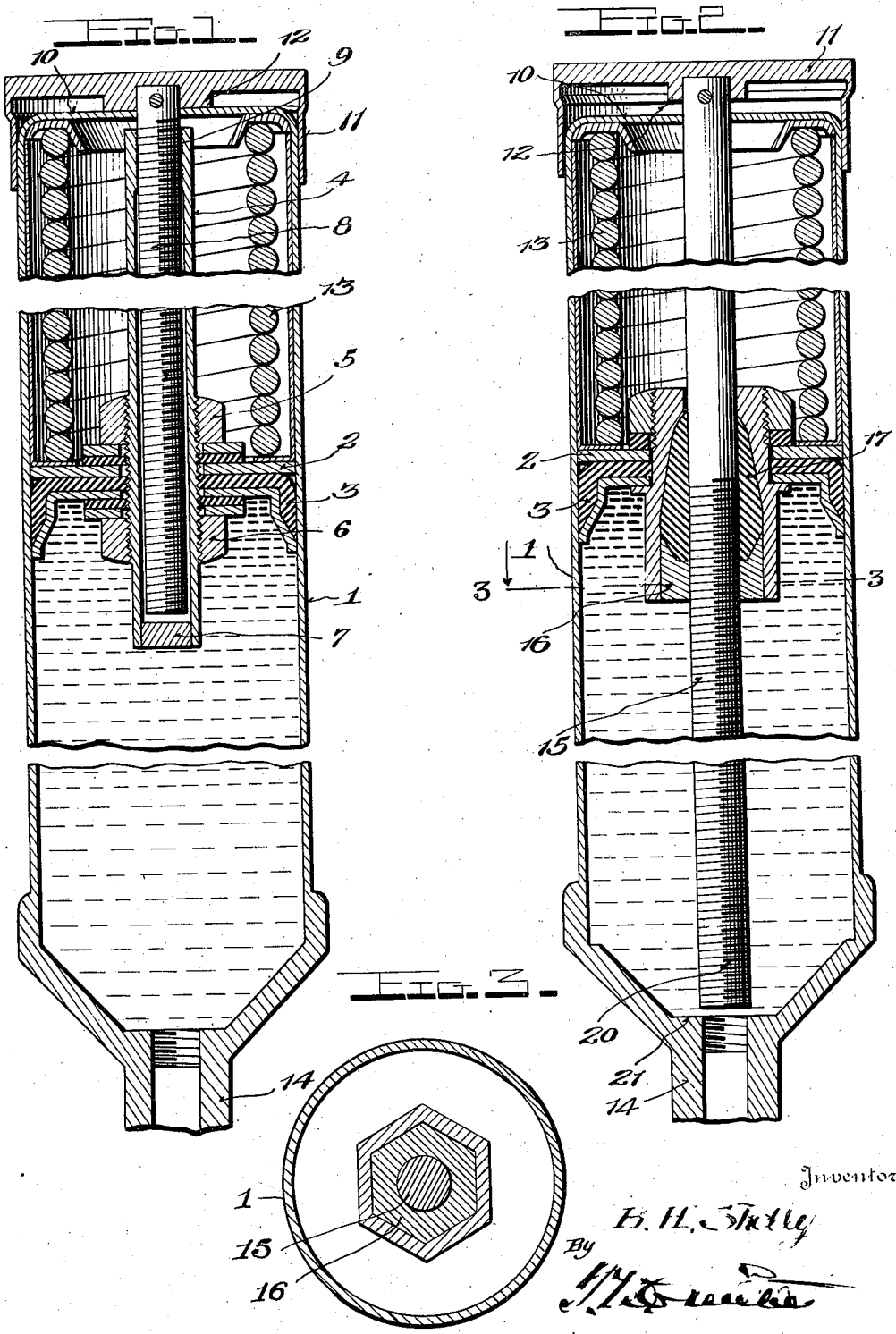

1,477,459

UNITED STATES PATENT OFFICE.

BERNARD H. SKELLY, OF BRIDGEPORT, CONNECTICUT, ASSIGNOR TO BOWEN PRODUCTS CORPORATION, OF AUBURN, NEW YORK, A CORPORATION OF NEW YORK.

AUTOMATIC LUBRICANT-SUPPLYING MAGAZINE.

Application filed April 2, 1921. Serial No. 457,918.

*To all whom it may concern:*

Be it known that I, BERNARD H. SKELLY, a citizen of the United States, residing at the city of Bridgeport, in the county of Fairfield and State of Connecticut, have invented certain new and useful Improvements in Automatic Lubricant-Supplying Magazines; and I do declare the following to be a full, clear, and exact description of the invention, such as will enable others skilled in the art to which it appertains, to make and use the same.

This invention relates to certain new and useful improvements in automatic lubricant supplying magazines and more particularly is designed as an improvement upon an application filed by me on July 17, 1920, Serial Number 396898 and is especially for use in connection with an oil gun system shown and described in Letters Patent No. 1372565 issued to me on March 22, 1921.

In the application above mentioned the incessant pressure of the spring against the oil or grease when the device is not in use renders leakage of the oil or grease past the piston liable, as well as leakage through the valve, and accordingly the present invention aims to provide a structure overcoming these objections.

The primary object of the invention therefore is to provide means for normally relieving the pressure of the device on the oil or grease when the device is not in use and for restoring the pressure when the device is to be used.

A further object of the invention is to provide means for the stated purpose which can be adjusted or regulated according to whether one or more oil cups are to be filled.

In the drawings:

Figure 1, is a longitudinal sectional view of one form of the invention, Figure 2 is a similar view of a modified form, and Figure 3, is a section at the line 3—3 of Figure 2.

In proceeding in accordance with the present invention, a reservoir or cylinder 1, is provided having a piston 2 therein, the latter equipped with suitable packing 3, held in position on a hollow piston rod 4 by means of suitable nuts 5 and 6 arranged above and below the piston. The lower end of the rod 4, is provided with a plug 7, which effects an oil tight seal.

Rotatably mounted on the interior of the hollow piston rod 4, is a rod 8 which latter is threaded throughout its length and has its threads engaged with interior threads 9 formed adjacent the top of the hollow piston rod 4.

The upper end of the rod 8 projects through the top wall 10 of the reservoir 1, and is secured to a cylindrical cap 11 formed with a hub or abutment 12, the latter being at all times in engagement with the top wall 10, when the lubricant is relieved of pressure. The cap somewhat closely embraces the reservoir so as to present a finished appearance, but is still capable of free rotating movement relative to the reservoir. A coil spring 13 engages between the end wall 10 of the reservoir and the piston 2 so as to exert pressure on the latter and to act to automatically eject the lubricant through the discharge nozzle 14, the latter being formed to be secured to a valved distributing nozzle, not shown.

When it is necessary to use some lubricant the operator turns the cap 11, so as to unscrew the rod 8 from the piston rod 4 a predetermined distance, or at least a distance sufficient to allow the proper quantity of lubricant to be removed. When the cap 11 is turned so as to withdraw the rod 8 as far as desired from the hollow piston rod 4, the abutment 12 will then be spaced from the top of the cylinder, because the piston 2 cannot descend owing to the immovability of the mass of lubricant, but as soon as the lubricant supply valve is opened the lubricant commences to feed out and the piston commences to descend and this descent of the piston will, of course, carry the hollow piston rod as well as the rod 8, and consequently the lubricant will continue to feed as long as the supply nozzle is open and until the abutment 12 again engages the top of the reservoir, whereupon the feeding will stop and all pressure will be relieved.

By experimenting the quantity of lubricant necessary for filling a certain number of grease cups can be easily determined, although a gauge may be placed on the outside of the cylinder, if desired, and the cap 11 then be withdrawn to a predetermined distance. Or, the operator can work the cap as the lubricant is ejected, and after use relieve the pressure on the lubricant as is evident.

Referring to Figure 2, the rod 15 is threaded within a part 16 of the piston structure, which part corresponds with the hollow piston rod 4, packing 17 being placed around this rod and confined by the inclined surfaces of the parts so that there can be no leakage of the lubricant above the piston.

When the cap 11 has been operated to withdraw the rod 15 a predetermined distance, effected by unscrewing this rod within the part 16, the bottom of the rod will be elevated above the oil outlet passage in the nozzle 14, as shown at Figure 2, that is to say, this rod will be raised away from the bottom of the reservoir, and therefore as soon as the lubricant begins to flow through the supply nozzle for the grease cups the piston will commence to descend and will continue descending until the bottom of rod 15 again strikes the bottom of the reservoir whereupon all pressure against the lubricant will be relieved. The packing 17 and its associated elements, are so formed that the back pressure of the lubricant and the down pressure of the spring will force the packing closer against the rod 15.

In the instance of the structure of Figure 1 the piston cannot descend to feed the lubricant as long as the abutment 12 engages with the top of the reservoir, which means substantially as long as the head of the rod 8 is in abutment with the top of the reservoir, while at Figure 2 the piston cannot descend so long as the foot or extension 20 of the rod 15 is in engagement with the bottom 21 of the reservoir.

What is claimed is:

In combination with a lubricant reservoir having an outlet and a spring impelled piston for automatically ejecting the lubricant by pressure through the outlet, a rod threaded into engagement with the piston and having one end formed to close the outlet, and means connected to the rod for adjusting the position of the piston thereof by moving the rod away from the outlet so as to enable any predetermined quantity of lubricant to be ejected according to the distance which the rod has been moved from the outlet.

In testimony whereof I affix my signature hereto.

BERNARD H. SKELLY.